US009412381B2

(12) United States Patent
Bhaskaran

(10) Patent No.: US 9,412,381 B2
(45) Date of Patent: Aug. 9, 2016

(54) INTEGRATED VOICE BIOMETRICS CLOUD SECURITY GATEWAY

(75) Inventor: Sajit Bhaskaran, Sunnyvale, CA (US)

(73) Assignee: ACK3 BIONETICS PRIVATE LTD., Singapore (SG)

( * ) Notice: Subject to any disclaimer, the term of this patent is extended or adjusted under 35 U.S.C. 154(b) by 833 days.

(21) Appl. No.: 13/076,261

(22) Filed: Mar. 30, 2011

(65) Prior Publication Data

US 2011/0246196 A1      Oct. 6, 2011

Related U.S. Application Data

(60) Provisional application No. 61/319,244, filed on Mar. 30, 2010.

(51) Int. Cl.
*G10L 17/24*      (2013.01)
(52) U.S. Cl.
CPC ....................... *G10L 17/24* (2013.01)
(58) Field of Classification Search
USPC .......................................................... 704/235
See application file for complete search history.

(56) References Cited

U.S. PATENT DOCUMENTS

| | | | | |
|---|---|---|---|---|
| 4,783,804 A * | 11/1988 | Juang et al. | .................. | 704/245 |
| 5,247,497 A * | 9/1993 | Cohn | ......................... | 369/26.01 |
| 5,311,594 A * | 5/1994 | Penzias | ......................... | 713/183 |
| 5,509,104 A * | 4/1996 | Lee et al. | ........................ | 704/256 |
| 5,774,525 A * | 6/1998 | Kanevsky et al. | ......... | 379/88.02 |
| 5,825,871 A * | 10/1998 | Mark | ........................ | 379/357.03 |
| 5,848,130 A * | 12/1998 | Rochkind | ................... | 379/88.01 |
| 6,154,526 A * | 11/2000 | Dahlke et al. | ............. | 379/88.03 |
| 6,219,407 B1 * | 4/2001 | Kanevsky et al. | ......... | 379/88.02 |
| 6,256,737 B1 * | 7/2001 | Bianco et al. | ................ | 713/186 |
| 6,799,163 B2 * | 9/2004 | Nolan | .......................... | 704/273 |
| 6,995,689 B2 * | 2/2006 | Crank | .......................... | 340/970 |
| 7,110,987 B2 * | 9/2006 | Engelhart | ....................... | 705/75 |
| 7,269,563 B2 * | 9/2007 | Douros | ......................... | 704/275 |
| 7,310,734 B2 * | 12/2007 | Boate et al. | ................... | 713/186 |
| 7,333,798 B2 * | 2/2008 | Hodge | .......................... | 455/411 |
| 7,383,572 B2 | 6/2008 | Rolfe | | |
| 7,536,304 B2 * | 5/2009 | Di Mambro et al. | ......... | 704/273 |
| 7,573,993 B2 * | 8/2009 | Bookstaff | ................ | 379/201.01 |
| 7,620,037 B1 | 11/2009 | Bhaskaran et al. | | |

(Continued)

OTHER PUBLICATIONS

Ulanoff, Iphone Multitasking, Where you At ?, http://www.pcmag.com/article2/0,2817,2343381,00.asp, Mar. 18, 2009, 2 pgs.

(Continued)

*Primary Examiner* — Fariba Sirjani
(74) *Attorney, Agent, or Firm* — McDermott Will & Emery LLP

(57) ABSTRACT

A triple factor authentication in one step method and system is disclosed. According to one embodiment, an Integrated Voice Biometrics Cloud Security Gateway (IVCS Gateway) intercepts an access request to a resource server from a user using a user device. IVCS Gateway then authenticates the user by placing a call to the user device and sending a challenge message prompting the user to respond by voice. After receiving the voice sample of the user, the voice sample is compared against a stored voice biometrics record for the user. The voice sample is also converted into a text phrase and compared against a stored secret text phrase. In an alternative embodiment, an IVCS Gateway that is capable of making non-binary access decisions and associating multiple levels of access with a single user or group is described.

42 Claims, 4 Drawing Sheets

Integrated Voice Biometrics Cloud Security Gateway (IVCS Gateway)

(56) References Cited

U.S. PATENT DOCUMENTS

| | | | | |
|---|---|---|---|---|
| 7,636,855 B2* | 12/2009 | Applebaum et al. | | 713/186 |
| 7,881,446 B1* | 2/2011 | Apple et al. | | 379/114.21 |
| 7,917,949 B2* | 3/2011 | Conley | | G06F 21/32 |
| | | | | 365/185.11 |
| 8,130,677 B2* | 3/2012 | Barker et al. | | 370/255 |
| 8,130,929 B2* | 3/2012 | Wilkes et al. | | 379/201.12 |
| 8,185,646 B2* | 5/2012 | Headley | | 709/229 |
| 8,255,223 B2* | 8/2012 | Wang | | 704/275 |
| 8,255,318 B2* | 8/2012 | Royyuru | | 705/38 |
| 8,407,112 B2* | 3/2013 | Walter | | 705/30 |
| 8,428,227 B2* | 4/2013 | Angel et al. | | 379/68 |
| 8,442,824 B2* | 5/2013 | Aley-Raz et al. | | 704/247 |
| 8,510,225 B2* | 8/2013 | Yach et al. | | 705/50 |
| 8,533,118 B2* | 9/2013 | Weller et al. | | 705/44 |
| 8,595,804 B2* | 11/2013 | Pratt et al. | | 726/5 |
| 2001/0049785 A1* | 12/2001 | Kawan et al. | | 713/156 |
| 2002/0006133 A1* | 1/2002 | Kakemizu et al. | | 370/401 |
| 2002/0147914 A1* | 10/2002 | Arnold | | 713/186 |
| 2002/0177433 A1* | 11/2002 | Bravo | | H04L 63/0853 |
| | | | | 455/411 |
| 2003/0046083 A1* | 3/2003 | Devinney et al. | | 704/273 |
| 2003/0081738 A1* | 5/2003 | Kohnle et al. | | 379/67.1 |
| 2003/0084289 A1* | 5/2003 | Watanabe | | 713/168 |
| 2006/0021057 A1* | 1/2006 | Risan | | G06F 21/10 |
| | | | | 726/26 |
| 2006/0106605 A1* | 5/2006 | Saunders et al. | | 704/246 |
| 2006/0155549 A1* | 7/2006 | Miyazaki | | 704/275 |
| 2006/0230454 A1* | 10/2006 | Achanta et al. | | 726/24 |
| 2006/0245576 A1* | 11/2006 | Henry | | H04M 3/42068 |
| | | | | 379/265.01 |
| 2006/0282680 A1* | 12/2006 | Kuhlman et al. | | 713/186 |
| 2007/0174080 A1* | 7/2007 | Outwater | | 705/1 |
| 2007/0185718 A1* | 8/2007 | Di Mambro et al. | | 704/273 |
| 2007/0253353 A1* | 11/2007 | Korus | | 370/328 |
| 2008/0155659 A1* | 6/2008 | Gazier et al. | | 726/4 |
| 2009/0006856 A1* | 1/2009 | Abraham et al. | | 713/183 |
| 2009/0153292 A1* | 6/2009 | Farb | | 340/5.52 |
| 2009/0252063 A1* | 10/2009 | Owen et al. | | 370/255 |
| 2009/0279436 A1 | 11/2009 | Chin et al. | | |
| 2009/0292619 A1* | 11/2009 | Kagan | | G06Q 20/102 |
| | | | | 705/26.1 |
| 2009/0313165 A1* | 12/2009 | Walter | | G06F 21/35 |
| | | | | 705/41 |
| 2010/0115607 A1* | 5/2010 | Pratt et al. | | 726/18 |
| 2011/0154452 A1* | 6/2011 | Novack | | H04L 63/08 |
| | | | | 726/5 |
| 2011/0178931 A1* | 7/2011 | Kia | | 705/50 |
| 2011/0246196 A1* | 10/2011 | Bhaskaran | | G10L 17/24 |
| | | | | 704/235 |
| 2013/0058474 A1* | 3/2013 | Claudatos et al. | | 379/211.02 |
| 2013/0097682 A1* | 4/2013 | Zeljkovic | | H04L 9/3231 |
| | | | | 726/7 |
| 2013/0132091 A1* | 5/2013 | Skerpac | | 704/273 |
| 2013/0347129 A1* | 12/2013 | Samuelsson | | H04L 9/321 |
| | | | | 726/28 |
| 2015/0187359 A1* | 7/2015 | Bhaskaran | | G10L 17/24 |
| | | | | 704/235 |

OTHER PUBLICATIONS

Rosenburg, et al., Best Current Practices for Third Party Call Control, http://tools.ietf.org/html/rfc3725, Apr. 2004.

Rigney, et al., Remote Authentification Dial In User Service (RADIUS), Jun. 2000, published by IETF, 77 pgs.

Calhoun, et al., Diameter Base Protocol (Diameter), Internet RFC 3588, published by IETF, 148 pgs, 2003.

"What is IVR (how to implement an IVR)," <http://www.asteriskguru.com/tutorials/ivr.html>, 2007.

* cited by examiner

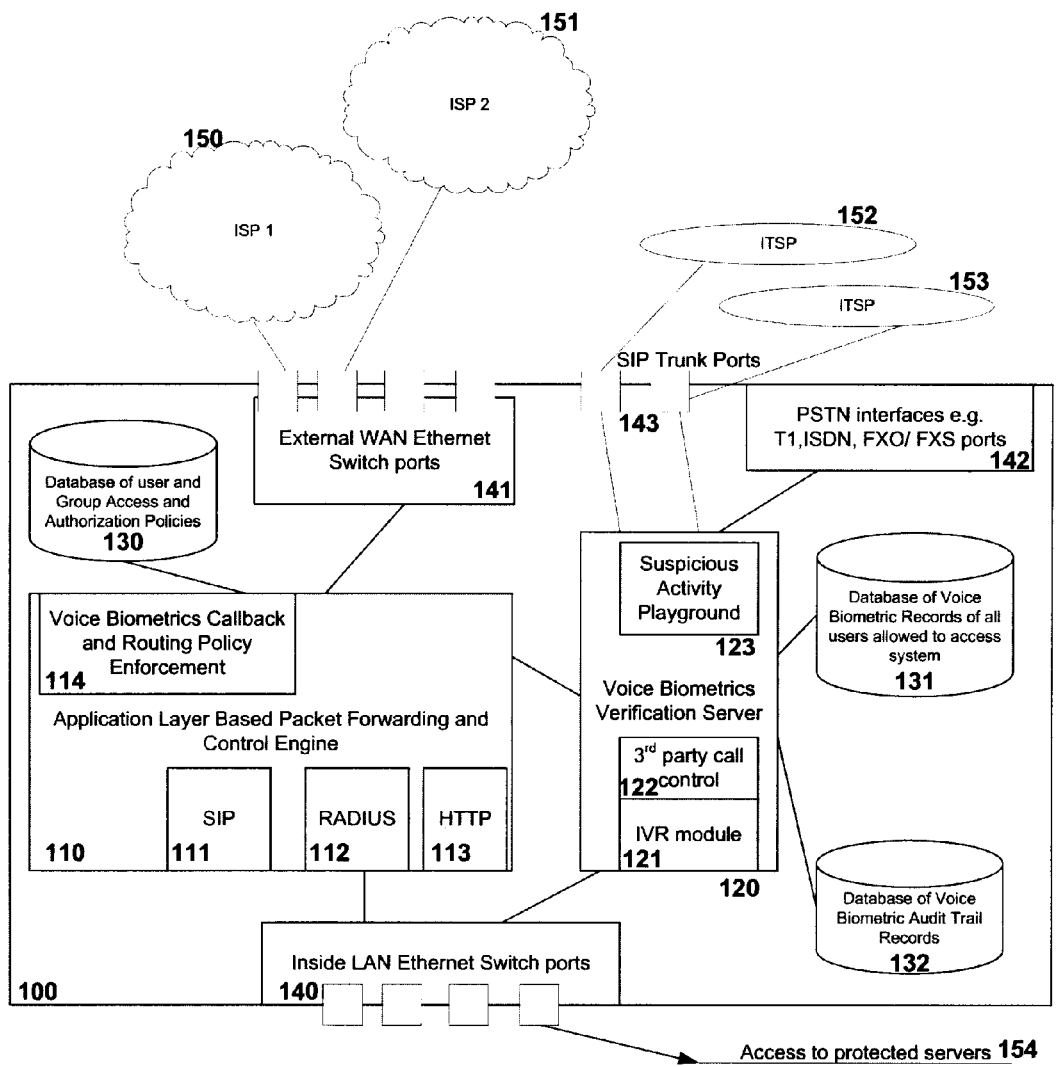
Fig 1 - Integrated Voice Biometrics Cloud Security Gateway (IVCS Gateway)

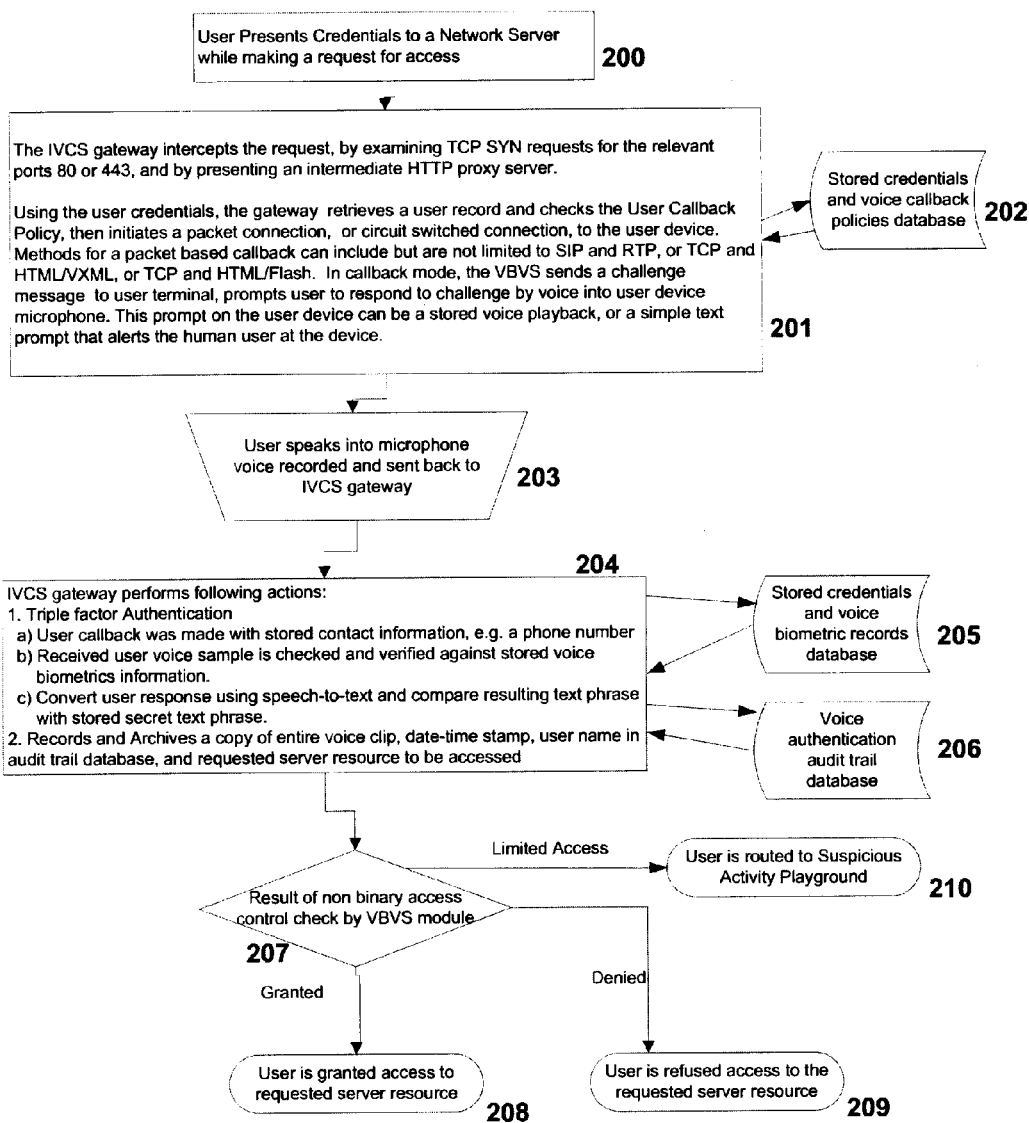
Fig 2 – Triple Factor Authentication Callback Method

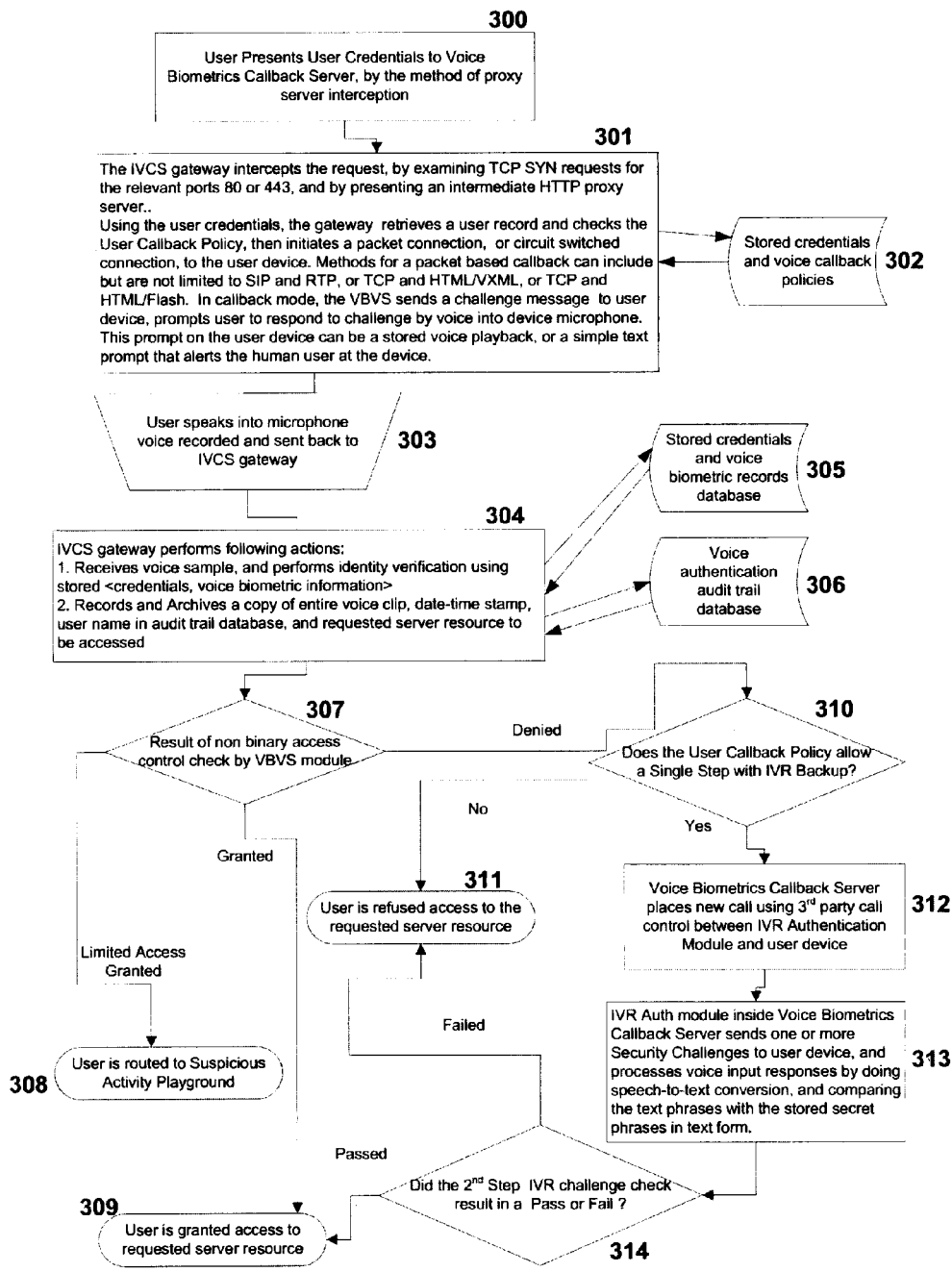
Fig 3 – Double Factor Authentication with IVR Speech-to-Text

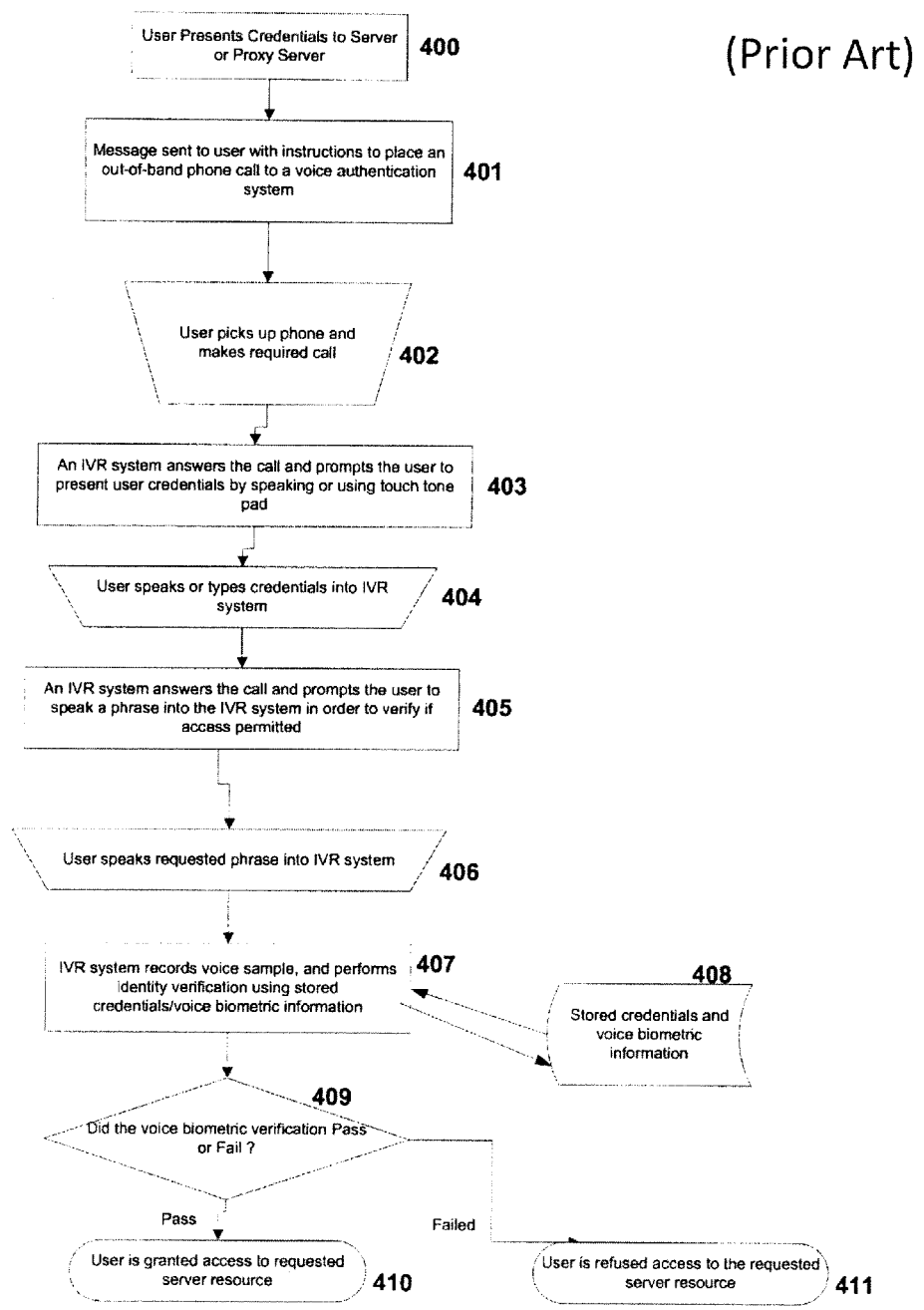
Fig 4 - Typical Workflow for Authentication/Authorization when using Voice Biometrics

INTEGRATED VOICE BIOMETRICS CLOUD SECURITY GATEWAY

CROSS REFERENCES TO RELATED APPLICATIONS AND PATENTS

This application claims priority to U.S. Provisional Application No. 61/319,244, filed on Mar. 30, 2010 which is incorporated herein by reference. It also refers to the U.S. Pat. No. 7,383,572, "Use of public switched telephone network for authentication and authorization in on-line transactions", U.S. Pat. No. 7,620,037, "Reliable ISP access cloud state detection method and apparatus", and United States Patent Application US-2009-0279436-A1, dated 11 Dec. 2009 "Method for Multiple Link Quality of Service for Voice and Video over Internet Protocol".

FIELD

The present invention relates generally to systems, methods and processes for Computer and network security. More particularly, the present invention relates to integrated voice biometrics Cloud security gateway.

BACKGROUND

Human users access systems either as mobile or non mobile users, and from varying points of a network. Any system that requires a user to be (a) authenticated and/or (b) authorized to use a specific computer resource can be described as a human user system.

By this definition many public web sites are not human user systems, and indeed many of these sites welcome automated web crawlers and search engine computers when they seek access.

Any VPN server, or online banking website, or medical record website however, usually requires a human user to go through an authentication/authorization check first—these are human user systems.

Today, human user systems are subjected to various security and fraud attacks, including botnet attacks which attempt to take over a server and steal data, including users' private information.

Double Factor Authentication used Currently for Online Banking

A customer enrolls in a program launched by a bank for online banking services. The bank mails to the customer's home or office address a physical device called a hardware token, (alternately called a "dynamic token" or "one-time token"). This generates electronically a unique random number every time a button is pressed by the human user. When the human user wishes to log in to the online banking service using a personal computer or other user terminal, he or she will be prompted to generate and then type in this unique random number within a certain time window. The system retrieves the user's identification information, and based on that, it independently calculates a random number as well, based on the number of seconds transpired since the hardware token was created. As long as the human user types in a number that matches the number calculated by the system, the user is allowed access.

There are several drawbacks to this approach. Primarily, it is not a human user that is being authenticated, but the possession of a calculating device, in this case the hardware token. If the device is stolen even momentarily and without the user knowing, the user's private access is compromised. Secondly, there are ease of use issues: the token has to be carried around, care has to be taken not to lose it, manipulating both a user terminal to access computerized data and the hardware token, at the same time and within the number of seconds allowed by the token system, is very cumbersome. If the time is exceeded because the user was slow in typing or for some other reason, the entry is rejected and the user has to try again. Having to use two devices and multiple steps is very cumbersome.

Double and Triple Factor Authentication

The above was an example of "double factor" authentication: two factors were needed, a Password, which the user knew or memorized, and something the user possessed, the token. All known double factor authentication methods over the Internet cloud today involve the human user having to use more than one device and more than one step, resulting in excessive time being consumed. This inconvenience of having to handle multiple devices and multiple steps, plus the resulting loss of time, has resulted in poor user acceptance of many highly secure systems which use a third factor for authentication, human biometrics, such as fingerprint or voiceprint based systems. Triple factor authentication is defined as all three of the above factors being checked: a) something that a user knows, b) something that a user possesses, and c) something that the user is, namely, a biometrics factor. Prior art systems that use triple factor authentication use multiple steps that require multiple inputs from a user over time, which is highly inconvenient and uses and excessive amount of the user's time.

The flow chart in FIG. 4 shows another example of how voiceprint biometrics is being used by some organizations today. It involves far too many steps, extra device handling by requiring the user to make a phone call in order to complete a web access request, and too much time is consumed. This has often resulted in poor end user acceptance of these systems. This kind of system is fully documented in U.S. Pat. No. 7,383,572.

Mobile User Trends and Cloud Security

New mobile devices—such as Apple iPhones, Blackberry smartphones, Google's Android phones, and lately Apple's new iPad tablet computer—all come with built in web browsers as the easiest means of communicating with the Internet cloud. These new mobile devices are seeing widespread and rapid adoption. Along with that are requirements by the users of these mobile devices to use them for all sorts of online Internet transactions.

However, because mobile devices are much more susceptible to theft or loss, the cloud security mechanisms enforced by data server administrators have evolved to become much more stringent, in order to avoid fraud, identity theft, and loss or theft of private data. As these security mechanisms have become more stringent, user inconvenience when attempting to access online systems over the cloud has only increased, and multiple devices and multiple steps are still needed for double or triple factor authentication. Compounding the problem, some mobile devices in certain voice-call situations cannot handle more than one task at the same time.

Voice Biometrics—Lack of Easily Administered Appliances

While voice biometrics are an attractive security option, the use of voice biometrics have been mostly limited in the current moment to telephone service providers, and also in telephone based call and contact centers. Most systems have been built around the concept of receiving a phone call directly from a human user, either by regular PSTN or via Voice over IP, in order for a voice biometric security check to take place.

Threats from the Inside are Still a Massive Problem

Recent cases show that while external attacks are important and more common, many large cases of financial fraud and other theft of data take place from motivated insiders. Very often these insiders are staff working in the IT department. Since insiders usually have access by a single login and password to the entire internal network, much abuse of such privileges have occurred and continue to occur, to the detriment of their employers.

Limited State of Firewall Technology and Fraud Prevention

All known firewall appliances are binary in their decision making today—either grant or deny access—there are no other choices. In the case of larger organizations where fraud or theft of data is a real concern, and which are manned by round-the-clock security i.e. 24×7 security staffing, there is little information about what a potential intruder was attempting to do before the access was denied.

SUMMARY

A triple factor authentication in one step method and system is disclosed. According to one embodiment, an Integrated Voice Biometrics Cloud Security Gateway (IVCS Gateway) intercepts an access request to a resource server from a user using a user device. IVCS Gateway then authenticates the user by placing a call to the user device and sending a challenge message prompting the user to respond by voice. After receiving the voice sample of the user, the voice sample is compared against a stored voice biometrics record for the user. The voice sample is also converted into a text phrase and compared against a stored secret text phrase. In an alternative embodiment, an IVCS Gateway that is capable of making non-binary access decisions and associating multiple levels of access with a single user or group is described.

The above and other preferred features, including various novel details of implementation and combination of elements, will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIG. 1 is a block diagram of the Integrated Voice Biometrics Cloud Security Gateway (IVCS Gateway).

FIG. 2 is a flow chart that depicts the Triple Factor Authentication Callback Method.

FIG. 3 is a flow chart that depicts a Double Factor Authentication with Interactive Voice Response (IVR) Speech-to-Text conversion.

FIG. 4 is a flow chart of a Typical Workflow for Authentication/Authorization when using Voice Biometrics.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A triple factor authentication method and system is disclosed. According to one embodiment, an Integrated Voice Biometrics Cloud Security Gateway (IVCS Gateway) intercepts an access request to a resource server from a user using a user device. IVCS Gateway then authenticates the user by placing a call to the user device and sending a challenge message prompting the user to respond by voice. After receiving the voice sample of the user, the voice sample is compared against a stored voice biometrics record for the user. The voice sample is also converted into a text phrase and compared against a stored secret text phrase.

The main purpose of the IVCS Gateway and the associated methods are to protect private data and privileges belonging to a class or group of human users, when that data and associated computer resources are accessible from the Internet cloud, through (a) direct WAN (e.g. single hop using the web) or (b) indirect WAN (e.g. multiple hops using a combination of intermediate gateways or VPN servers) or (c) means of access. This invention guarantees the prevention of unauthorized access, potential misuse and outright criminal fraud, as well as automatically protecting against the common botnet and DDOS attacks that public access servers are vulnerable to.

FIG. 1 is a block diagram showing how an IVCS Gateway (100) is constructed by persons of ordinary skill in the art. IVCS Gateway comprises a number of elements. A key block element is the Application Layer Based Packet Forwarding and Control Engine (110) (App Layer Engine) that interfaces directly to the Internet cloud, which itself is comprised of multiple Internet service provider (ISP) clouds. Two ISP clouds (150 and 151) are shown for the minimum level of redundancy required in FIG. 1. Since the IVCS Gateway (100) is expected to be mostly deployed in Internet Data Centers, one key function of the App Layer Engine (110) is to provide Internet service assurance for the various IP protocols used by outsiders to communicate with the IVCS gateway—these include but are not limited to HTTP (113), RADIUS (112) and SIP (111). Service assurance does include rapid auto-correction from instabilities that take place in the Internet every day. It also includes quality-of-service enforcement, which gives real time voice over Internet traffic a higher priority when data traffic is high.

The most important function in this block element is to intercept all requests from the cloud for remote user access to an internal server, and to enforce the various Group and User policies regarding access, as explained in more details later. The Method of Group and User Combination Analysis, as well as which methods to pick regarding Single-Step Callback or routing an access request to the Suspicious Activity Playground (123) (explained in detail in a later section). The specific module within the App Layer Engine (110) that enforces these policies is the Voice Biometrics Callback and Routing engine (114), which maintains a User and Group Access and Authorization Policies Database (130).

An App Layer Engine implementation is similar to what is typically implemented in enterprise security firewalls for enforcing rules and access controls to IP based resources, and is familiar to those of ordinary skill in the art.

A unique feature of this invention is that the type of device the user is using will be automatically detected, and the information used in implementing a callback. This is done by examining the HTTP header of the initial GET request, and looking for the HTTP_USER_AGENT field. The following detects an Apple iPhone, for example: HTTP USER_AGENT=Mozilla/5.0 (iPhone; U; CPU like Mac OS X; en) AppleWebKit/420+ (KHTML, like Gecko) Version/3.0 Mobile/1C25 Safari/419.3

This information allows the App Layer engine to pick the right callback method. Picking the wrong callback method will result in a failed callback. For instance some user devices do not support the Flash media player from Adobe, but will support Java or a normal phone call while the web browser is running.

Connecting the IVCS gateway to the external cloud (150 & 151) are one or more Outside Network ports (141). In general a network port is one capable of both receiving and transmitting network packets, which could be IP protocol packets.

Connecting the IVCS gateway to the inside, so called "trusted network" (154) is at least one Inside Network port (140), where once allowed in, traffic from the outside world is directed to.

Inherent in this invention is the notion of callback within the user transaction, or within the user's attempt to authenticate by presenting credentials. The Single-step Callback procedure is shown in the flow chart in FIG. 2, and described in details later on in this document. FIG. 3 is a flow chart that depicts a variation of the single step callback procedure, the Single Step with interactive voice response (IVR) Backup procedure. This procedure is optionally invoked in cases where the voice biometric verification returned a "Deny" result and a backup authentication procedure based on double-factor authentication is allowed, instead of a stronger triple-factor authentication. IVR backup procedure is described in details later on in this document.

Whether the Single-step Callback is rigidly enforced, or Single Step with IVR BackUp procedure is allowed, is controlled by entries in the User and Group Access and Authorization Policies Database (130). This gives the operator great flexibility. In some small fraction of cases where an enrolled user's voice biometric is falsely rejected, this enables the authentication procedure to go through while recording the voice activity in the Audit Trail Database.

Each user that is registered or enrolled in the authentication system may attempt to access the system from a multiplicity of locations and also using different devices at different time, and the callback policy, as well as previously stored voice biometric record to retrieve, will be unique to each situation. Example callback actions are (a) use HTTP and Flash (b) use SIP trunking and SIP/RTP with a POTS phone number (c) use the traditional telephony port and a POTS phone number.

Voice Biometrics Verification Server (VBVS) (120) module can be built as an embedded server module which performs: (a) voice biometric matching against a database of User/Group Voice Biometric Records, (b) speech recognition and secret answer/phrase matching against a database of User/Group Voice Biometric Records (131), and (c) to implement callback to a requesting user by using a built in third party Call Control (3PCC) module (122), and a built in Interactive Voice Response (IVR) module (121). 3PCC is described in IETF (Internet Engineering Task Force) publication RFC3725.

Another inherent feature is the notion of "routing" an attempted authentication request internally within the system—a completely validated and authorized user can be routed to the requested resources for example, while a suspect user could be routed to the Suspicious Activity Playground (123) (see later section for more details).

The Voice Biometrics Verification Server module (120) takes directives and acts under the control of the Voice Biometrics Callback and Routing Policy Control engine (110). A few rules govern its function:

(a) It will never initiate calls by itself but only under the command of the Voice Biometrics Callback and Routing Engine (110).

(b) It never answers any incoming phone call, except only where the calling party phone number is identifiable, and has been registered and associated previously with a known user's voice biometric record.

Single Step Reliability Support for Multiple User Terminal Devices:

The VBVS can be implemented to support multiple voice biometrics records per user. In particular but not limited to this case, each different type of user terminal device that a user wishes to use can be "enrolled" or "registered" in the system, along with voice biometrics data that are a function not only of the user's unique voice characteristics, but also of the device transmitting those voice signals. When a user attempts to authenticate remotely, the IVCS gateway will first perform an auto-detect of the type of user terminal device. The second step, once the type of user terminal device is identified, as well as the user's claimed identity, is to retrieve the exactly one out of many voice biometrics records for that user that were enrolled at some previous time using the specific user terminal device.

Auto detect of device type can be done in two ways. For a smart phone using a web browser, a persistent cookie can be stored by the IVCS gateway into the web browser and its associated permanent storage i.e. its flash memory. This persistent cookie can be used to identify the voice-biometric data record enrolled by the user using the smartphone's microphone, along with any additional phone number belonging to that smartphone, since the callback policy may require that the IVCS place a voice call to that specific phone number in order to finish the voice verification and double factor challenge as shown in FIG. 2. Since this will be done with the VB record specific to that microphone, the chance of a false-record-reject will be slim.

For a normal desktop computer user (e.g. employee in an enterprise or business) the same persistent cookie concept can be employed as above.

For an inbound phone call user, if the IVCS identifies the calling party number and associates it correctly with a registered user and one of that registered user's selected user terminal devices; it then retrieves the correct user VB record from its database in order to issue a double factor challenge as depicted in FIG. 2.

As an example, a user may enroll 3 voice biometric records (a) the first associated with his desk PC (b) the second associated with his deskphone (c) the third associated with his smartphone, e.g. iPhone or Android phone. At connection attempt time, the IVCS gateway will automatically retrieve the correct voice biometrics record with which to place an authentication challenge.

The IVCS Gateway includes voice calling hardware options. In one case, packet network ports for SIP trunking are included. FIG. 1 shows 2 different SIP Trunk ports (143), each connecting to two different Internet Telephony Service Providers (ITSPs) (152 & 153). If the user device supports the receipt of a SIP/RTP type voice call while the web connection is on, but does not support Flash, this option may be used to implement the Callback.

FIG. 1 also shows an alternate hardware option for implementing voice Callbacks (142). This is for the case where a callback needs to be made using traditional phone methods instead of VoIP or HTTP. In traditional Plain Old Telephone Service (POTS), the 3 types of interfaces are (a) TI/E1 (b) ISDN (c) analog FXO/FXS ports. In some banking situations for example, certain kinds of staff access may be restricted by requiring that the employee answer an internal desk phone connected to an internal PBX.

The VBVS module (120) also records all accesses by storing the speech clips in the Voice Biometric Audit Trail Database (132). This recording is done simultaneously with the voice biometric verification and matching step. The record will include the entire speech clip, date and time begun and ended, resource access being attempted and associated user credentials.

The Voice Biometric Audit Trail Database (132) will be automatically backed up and replicated in real time, by routing over the Inside Network port (140) to a VPN or other router connecting to another remote data center, where a backup appliance and replicated database may be sited.

The data captured, including recordings of voice biometric information, as described in this Voice Biometric Audit Trail Database (132) can be and has been used successfully in criminal court proceedings, in many countries including the United States. The advance knowledge of such provable criminal liability acts as a powerful deterrent to breaches and attempts at fraud or theft from the inside, as well as outside.

Group and User Combination Analysis

In many situations, a legitimate user may be under physical threat or held hostage while being forced to access a computer system. It should be possible for the compromised user to signal to the apparatus that due to an involuntary situation some harm may result in granting access.

The IVCS gateway (100) allows many group names to belong to one user name. "Tom Jones" and "Tom_Jones" and "TomJones" and "tomjones" can be 4 different group names belonging to the smile user name "tomjones"; note that everything is required to be case sensitive here.

A login prompt enforced by the gateway will typically say "ENTER USER OR GROUP NAME" as a method of requesting user credentials.

The IVCS gateway (100) allows a user, at time of enrollment, to specify a list of group names and declare one of them as a group name for SIGNAL_UNDER_THREAT. For example this user could reserve "Tom Jones" as his group name for SIGNAL_UNDER_THREAT, and could use "tomjones" for normal and regular access when completely private and not under threat.

When the IVCS gateway (100) receives a signal that a user is under such a compromised situation, the Voice Biometric Callback/Routing Engine can route the access request into a module called the Suspicious Activity Playground (123), further described below.

Non Binary Access Control

The IVCS Gateway implements non-binary access control, which is superior to binary access control found in prior art, as explained below.

In binary access control, the authentication attempt has only two possible outcomes: granted or denied.

In a non-binary access control IVCS Gateway, more than 2 possible outcomes are introduced. This allows an important choice. In certain situations, a request may be ordinarily denied, but it is often very beneficial to find out more information about what the denied user was attempting to do, as well as record in a permanent data storage such attempted transactions. A third and broad category of outcome can be "Limited Access Granted", and under this concept of limited access there can be many variations. One such variation can be "Limited Access Granted and Route to Suspicious Activity Playground", as described below.

Suspicious Activity Playground Functions

In the context of user access to knowledge and data bases, as well as online transactions, almost all useful systems today are implemented on secure web servers. A Suspicious Activity Playground (123) can be implemented as a secure web server embedded inside the IVCS Gateway (100). Its main function is as the name implies—it is only a simulation of the real set of web services available to all other users, with the intention of gathering data and even collecting attempted transactions, giving the impression that every transaction is being performed without actually performing it. In the Suspicious Activity Playground (123), no harm to actual data or persons will occur, its purpose is only to determine what a security compromised user is attempting to do, or search for, and (a) record it in the Voice Biometrics Audit Trail Database (132), (b) if needed in a 24×7 manned facility, trigger further human inspection and action to investigate the activity, or perform other actions necessary for safety or other benefit.

If the size and scale of the real web services require that portions of the Suspicious Activity Playground be implemented in external servers connected to the IVCS Gateway (100) by a secure communications channel, that too can be implemented by standard techniques available to web server engineers today.

A feature of the invention is that computer originated attacks are automatically blocked from getting through to the actual web, SSL VPN or other servers under attack. The App Layer Engine (110) includes an embedded and lightweight HTTP protocol inspection task which has a fixed static amount of memory, and which is designed to run forever. Many modern IP routers are implemented this way using a simple software "for loop"—which means that a high volume attack will not be able to degrade the performance of the IVCS gateway (100). Since it will (a) attempt to retrieve a persistent cookie associated with a user in order to retrieve the user callback records, and then (b) place the voice callback while insisting on receiving back a live human voice input from the microphone on the user's registered terminal device, it follows therefore that all such machine originated attacks will fail to get past (a) or (b), since they either do not have the cookie or are not able to send a live voice input via the correct microphone.

Insider Fraud Prevention

Insiders accessing a web server from the inside are also forced to go through the App Layer Engine (110) and HTTP based intercept and voice callback as described before. The enforcement is implemented by integrating VLAN routing and tag identification into the IVCS gateway (100), and ensuring that the inside servers are isolated in separate VLAN subnets from the inside user access devices (e.g. desktop computers). The App Layer Engine (110) will include a firewall module along with session flow counters that are recorded into the Voice Biometrics Audit Trail Database (132). The App Layer Engine (110) will also record inactivity based timeouts when the inside users cease using the system.

Many insider systems are not web based. For example, many are based on a user logging in with a text user-Id and password. For example, many UNIX servers use the secure shell (ssh) system. In addition to the web based intercept, the IVCS gateway implements a RADIUS based intercept.

The inside server to be protected can be programmed to send the non-web credentials using the RADIUS protocol. Here the inside server acts as a RADIUS client and the IVCS gateway acts as a RADIUS server. The Radius server is part of the App Layer Engine (110) and will therefore intercept every inside server authentication request. Next, it will then perform a callback to the user's cell phone or desk phone, and request a voice biometric verification. After a successful challenge-response, the date and time, the user credentials, the specific inside server address, as well as the voice recording of the human response, will be stored in the Voice Biometrics Audit Trail Database (132). As an alternative to RADIUS, the DIAMETER protocol can also be used.

RADIUS and DIAMETER are described in IETF (Internet Engineering Task Force) publications RFC2865 and RFC3588 respectively.

FIG. 2 illustrates the flow chart for Triple Factor Authentication Callback Method according to one embodiment. In step 200, a user presents credentials to a network server while making a request for access.

In step 201 The IVCS gateway intercepts the request, by examining TCP SYN requests for the relevant ports 80 or 443, and by presenting an intermediate HTTP proxy server. Using the user credentials, the gateway retrieves a user record and checks the User Callback Policy (202), and then initiates a packet connection, or circuit switched connection, to the user device. Methods for a packet based callback can include but are not limited to SIP and RTP, or TCP and HTML/VXML, or TCP and HTML/Flash. In callback mode, the VBVS sends a challenge message to user terminal, prompts user to respond to the challenge by voice into the device microphone. This prompt on the user device can be a stored voice playback, or a simple text prompt that alerts the human user at the device.

In step 203, user speaks into microphone. The user voice is recorded and sent back to IVCS gateway.

In step 204, IVCS gateway performs following actions:
1. Performs Triple factor Authentication:
   a) User callback was made with stored contact information, e.g. a phone number
   b) Received user voice sample is checked and verified against stored voice biometrics information (205).
   c) Convert user response using speech-to-text and compare resulting text phrase with stored secret text phrase.
2. Records and Archives a copy of entire voice clip, date-time stamp, user name in audit trail database, and requested server resource to be accessed (206)

In step 207, VBVS module verifies the result of non binary access control check.

If the result is 'GRANTED', then the user is granted access to requested server resource (208).

If the result is 'DENIED', then user is refused access to the requested server resource (209).

If the result is 'LIMITED ACCESS', then the user is routed to Suspicious Activity Playground (210).

FIG. 3 illustrates the flow chart for Double Factor Authentication with IVR Speech-to-Text conversion. In step 300 the user presents user credentials to Voice Biometrics Callback Server, by the method of proxy server interception.

In step 301, the IVCS gateway intercepts the request, by examining TCP SYN requests for the relevant ports 80 or 443, and by presenting an intermediate HTTP proxy server. Using the user credentials, the gateway retrieves a user record and checks the User Callback Policy (302), and then initiates a packet connection, or circuit switched connection, to the user device. Methods for a packet based callback can include but are not limited to SIP and RTP, or TCP and HTML/VXML, or TCP and HTML/Flash. In callback mode, the VBVS sends a challenge message to the user device, prompts user to respond to challenge by voice into device microphone. This prompt on the user device can be a stored voice playback, or a simple text prompt that alerts the human user at the device.

In step 303, the user speaks into microphone; the voice is recorded and sent back to IVCS gateway.

In step 304, IVCS gateway performs the following actions:
1. Receives voice sample, and performs identity verification using stored credentials/voice biometric information (305).
2. Records and Archives a copy of entire voice clip, date-time stamp, user name in audit trail database, and requested server resource to be accessed (306).

In step 307, VBVS module verifies the result of non binary access control check.

If the result is 'LIMITED ACCESS', then the user is routed to Suspicious Activity Playground (308).

If the result is 'GRANTED', the user is granted access to requested server resource (309).

If the result is 'DENIED', check if the User Callback Policy allows for a Single Step with IVR Backup (310).

If the result is 'NO', then the user is refused access to the requested server resource (311).

If the result is 'YES', the Voice Biometrics Callback Server places new call using 3rd party call control between IVR Authentication Module and user device (312).

In step 313, the IVR Authentication module inside Voice Biometrics Callback Server sends one or more security challenge messages to the user device, and processes voice input responses by doing speech-to-text conversion, and comparing the text phrases with the stored secret phrases in text form.

In step 314, a check is made to verify if the 2nd Step IVR challenge check result is Pass or Fail. If the result is a Pass, the user is granted access to requested server resource (309). If the result is a Fail, then the user is refused access to the requested server resource (311).

The flow chart in FIG. 4 shows another example of how voiceprint biometrics is being used by some organizations today. In step 400 the user presents credentials to a server or a proxy server.

In step 401, a message is sent to the user with instructions to place an out-of-band phone call to a voice authentication system.

In step 402, user picks up the phone and makes the required phone call.

In step 403, an IVR system answers the call and prompts the user to present user credentials by speaking or using touch tone pad.

In step 404, the user speaks or types credentials into IVR system.

In step 405, an IVR system answers the call and prompts the user to speak a phrase into the IVR system in order to verify if access permitted.

In step 406, the user speaks requested phrase into the IVR system.

In step 407, the IVR system records voice sample, and performs identity verification using stored credentials/voice biometric information (408).

In step 409, a check is made to see if the result of voice biometric verification is Pass or Fail.

If the result is a Pass, the user is granted access to requested server resource (410).

If the result is Fail, the user is refused access to the requested server resource (411).

A triple factor authentication in one step method and system is disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

I claim:

1. A computer-implemented method to authenticate a user through a triple factor authentication in one step, the method comprising:
    intercepting, by a gateway, an access request sent to a network address of a resource server from a user using a user device the access request comprising a unique user record identifier;
    identifying a specific user device used by the user to send the access request based on a cookie or an identifier stored in the specific user device by the gateway;
    selecting a voice biometrics record of the user recorded using the specific user device used by the user to send the access request from among a plurality of voice biometrics records stored for the user during an enrollment period;
    placing a call to the user device based on information from the cookie or the identifier;
    sending, to the user device, a challenge message prompting the user to respond by voice, wherein the challenge message corresponds to the selected voice biometrics record;
    receiving, from the user device, a voice sample of the user;
    comparing the voice sample of the user against the selected voice biometrics record;
    converting the voice sample into a speech-to-text phrase; and
    comparing the speech-to-text phrase against a stored secret text phrase to verify the speech-to-text phrase matches the stored secret text phrase.

2. The computer-implemented method of claim 1, further comprising determining a non-binary access check result for the user, wherein the non-binary access check result for the user device is either 'GRANTED', 'DENIED', or 'LIMITED ACCESS'.

3. The computer-implemented method of claim 2, wherein the user device is routed to a suspicious activity playground if the non-binary access check result for the data terminal is 'LIMITED ACCESS'.

4. The computer-implemented method of claim 1, wherein selecting the stored voice biometrics record comprises matching the specific user device with a specific device used to store the selected voice biometrics record.

5. The computer-implemented method of claim 1, further comprising checking a callback policy for the user device.

6. The computer-implemented method of claim 5, further comprising:
    confirming that the callback policy for the user device allows for a single step with interactive voice response backup when a user device access check is placing a call to the user device.

7. The computer-implemented method of claim 1, further comprising:
    storing the unique user record identifier;
    storing the voice sample of the user;
    storing an address of the resource server that is accessed; and
    recording an access time stamp for the resource server.

8. The computer-implemented method of claim 1, wherein multiple voice biometrics records are stored for the user, and each voice biometrics record corresponds to a specific user device.

9. The computer-implemented method of claim 2, further comprising storing multiple unique user record identifiers for the user, wherein each unique user record identifier corresponds to the non-binary access check result.

10. The computer-implemented method of claim 1, wherein intercepting the access request to the resource server from a user using a user device providing a unique user record identifier comprises the unique user record identifier being provided by an authentication, authorization and accounting (AAA) protocol.

11. The computer-implemented method of claim 10, wherein the user device is associated with an authorized phone number within an internal PBX network.

12. The computer-implemented method of claim 10, wherein the authentication, authorization and accounting (AAA) protocol is either RADIUS or DIAMETER.

13. The computer-implemented method of claim 1, wherein intercepting, by the gateway, the access request from the user using the user device to a resource server comprises intercepting, by the gateway, each access request from each user using a user device to a resource server, and wherein placing the call to the user device comprises placing a call to each user device for each access request.

14. The computer-implemented method of claim 1, wherein receiving the voice sample of the user comprises receiving a voice sample of a secret phrase of the user.

15. The computer-implemented method of claim 1, wherein sending the challenge message comprises providing a text message for display on the user device.

16. A non-transitory computer-readable medium having stored thereon a plurality of instructions, the plurality of instructions when executed by a computer, cause the computer to perform:
    intercepting, by a gateway, an access request sent to a network address of a resource server from a user using a user device the access request comprising a unique user record identifier;
    identifying a specific user device used by the user to send the access request based on a cookie or an identifier stored in the specific user device by the gateway;
    selecting a voice biometrics record of the user recorded using the specific user device used by the user to send the access request from among a plurality of voice biometrics records stored for the user during an enrollment period;
    placing a call to the user device based on information from the cookie or the identifier;
    sending, to the user device, a challenge message prompting the user to respond by voice, wherein the challenge message corresponds to the selected voice biometrics record;
    receiving, from the user device, a voice sample of the user;

comparing the voice sample of the user against the selected voice biometrics record;
converting the voice sample into a speech-to-text phrase; and
comparing the speech-to-text phrase against a stored secret text phrase to verify the speech-to-text phrase matches the stored secret text phrase.

17. The non-transitory computer-readable medium of claim 16, further comprising determining a non- binary access check result for the user, wherein the non-binary access check result for the user device is either 'GRANTED', 'DENIED', or 'LIMITED ACCESS'.

18. The non-transitory computer-readable medium of claim 17, wherein the user device is routed to a suspicious activity playground if the non-binary access check result for the data terminal is 'LIMITED ACCESS'.

19. The non-transitory computer-readable medium of claim 16, wherein selecting the voice biometrics record comprises matching the specific user device with a specific device used to store the selected voice biometrics record.

20. The non-transitory computer-readable medium of claim 16, further comprising checking a callback policy for the user device.

21. The non-transitory computer-readable medium of claim 20, further comprising:
confirming that the callback policy for the user device allows for a single step with interactive voice response backup when a user device access check is 'DENIED'.

22. The non-transitory computer-readable medium of claim 16, further comprising:
storing the unique user record identifier;
storing the voice sample of the user;
storing an address of resource server that is accessed; and
recording an access time stamp for the resource server.

23. The non-transitory computer-readable medium of claim 16, wherein multiple voice biometrics records are stored for the user, and each voice biometric record corresponds to a specific user device.

24. The non-transitory computer-readable medium of claim 17, wherein multiple unique user record identifiers can be stored for the user, and each unique user record identifier corresponds to the non-binary access check result.

25. The non-transitory computer-readable medium of claim 16, wherein intercepting the access request to the resource server from a user using a user device providing a unique user record identifier comprises the unique user record identifier being provided by an authentication, authorization and accounting (AAA) protocol.

26. The non-transitory computer-readable medium of claim 25, wherein the user device is an authorized phone number within an internal PBX network.

27. The non-transitory computer-readable medium of claim 25, wherein the authentication, authorization and accounting (AAA) protocol is either RADIUS or DIAMETER.

28. An integrated voice biometrics cloud security (IVCS) gateway system, comprising:
a database;
an application layer based packet forwarding and control engine comprising:
a voice biometrics callback and routing policy engine, and;
one or more IP protocol handlers;
a voice biometrics verification server (VBVS) comprising:
a third party call control,
an interactive voice response (IVR) module, and
a suspicious activity playground;
one or more WAN Ethernet switch ports for connection to ISP cloud; and
one or more LAN Ethernet switch ports for connection to resource servers,
wherein the application layer based packet forwarding and control engine executes instructions to:
intercept, by a gateway, an access request sent to a network address of a resource server from a user using a user device the access request the access request comprising a unique user record identifier;
identify a specific user device used by the user to send the access request based on a cookie or an identifier stored in the specific user device by the gateway;
select a voice biometrics record of the user recorded by using the specific user device used by the user to send the access request from among a plurality of voice biometrics records stored for the user during an enrollment period;
place a call to the specific user device based on information from the cookie or the identifier;
send, to the user device, a challenge messages prompting the user to respond by voice, wherein the challenge message corresponds to the selected voice biometerics record;
receive, from the user device, a voice sample of the user;
compare the voice sample of the user against the selected voice biometrics record;
convert the voice sample into a speech-to-text phrase; and
compare the speech-to-text phrase against a stored secret text phrase to verify the speech-to-text phrase matches the stored secret phrase.

29. The system of claim 28, wherein the application layer based packet forwarding and control engine executes instructions to determine a non-binary access check result for the user, and the non-binary access check result for the user device is either 'GRANTED', 'DENIED', or 'LIMITED ACCESS'.

30. The system of claim 29, wherein the user device is routed to a suspicious activity playground if the non-binary access check result for the data terminal is 'LIMITED ACCESS'.

31. The system of claim 28, wherein to select the stored voice biometrics record comprises to match the specific user device with a specific device used to store the selected voice biometrics record.

32. The system of claim 28, wherein the application layer based packet forwarding and control engine executes instructions to check a callback policy for the user device.

33. The system of claim 32, wherein the application layer based packet forwarding and control engine executes instructions to:
confirm that the callback policy for the user device allows for a single step with interactive voice response backup when a user device access check is 'DENIED'.

34. The system of claim 28, wherein the application layer based packet forwarding and control engine executes instructions to:
store the unique user record identifier;
store the voice sample of the user;
store an address of the resource server that is accessed; and
record an access time stamp for the resource server.

35. The system of claim 28, wherein multiple voice biometrics records are stored for the user, and each voice biometrics record corresponds to a different type of user device.

36. The system of claim 29, wherein multiple unique user record identifiers can be stored for the user, and each unique user record identifier corresponds to the non-binary access check result.

37. The system of claim 28, wherein the unique user record identifier is provided by an authentication, authorization and accounting (AAA) protocol.

38. The system of claim 37, wherein the user device is an authorized phone number within an internal PBX network.

39. The system of claim 37, wherein the authentication, authorization and accounting (AAA) protocol is either RADIUS or DIAMETER.

40. The system of claim 28, further comprising one or more PSTN ports.

41. The system of claim 28, further comprising one or more SIP trunk ports.

42. The computer-implemented method of claim 1, wherein the unique user record identifier is not a password.

* * * * *